Aug. 28, 1951
K. M. CHAPPELL
2,565,649
DIRECTION-RESPONSIVE CONTROL ARRANGEMENT
FOR REVERSIBLE MOTORS
Filed May 19, 1950
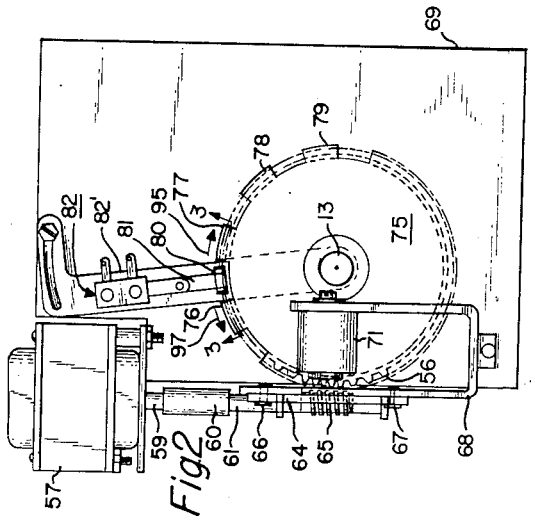
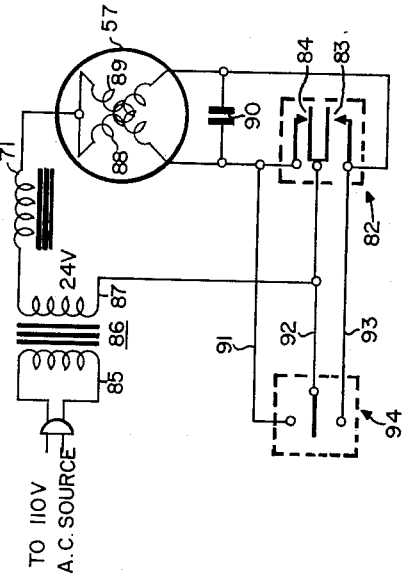
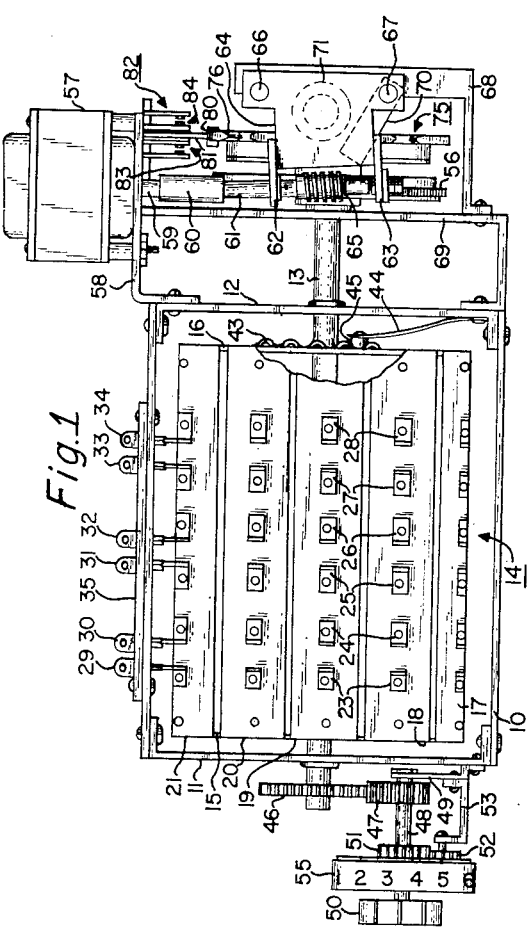
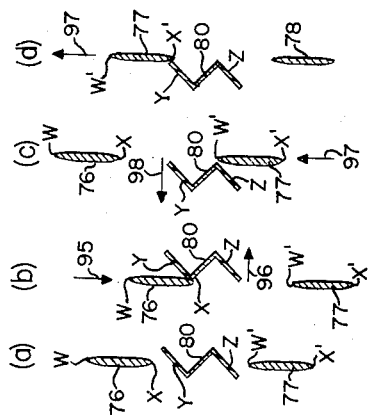
KENNETH M. CHAPPELL
*INVENTOR.*
BY *Francis W. Crotty*
HIS ATTORNEY Patented Aug. 28, 1951

2,565,649

UNITED STATES PATENT OFFICE 2,565,649

DIRECTION-RESPONSIVE CONTROL ARRANGEMENT FOR REVERSIBLE MOTORS

Kenneth M. Chappell, Round Lake, Ill., assignor to Zenith Radio Corporation, a corporation of Illinois Application May 19, 1950, Serial No. 163,060

10 Claims. (Cl. 318—468)

This invention relates to a direction-responsive control arrangement for a reversible motor for maintaining energization thereof to effect rotation in a selected one of two directions and through a preselected number of complete or fractional revolutions. Although the invention is useful in many environments, it is especially suited for incorporation in motor-operated positioning systems of the step-by-step type which are utilized for actuating the tuning device of a wave-signal receiver and it will be described in that connection.

A prior motor-driven positioning system of the "stepping" type includes one or more motor-actuated position-determining cams which operate switching means electrically connected in a relay circuit for the motor. This circuit is comprised of an electro-mechanical relay device for sealing or holding the energizing circuit of the motor until one of the cams conditions the switch to open the motor circuit. Ordinarily, such arrangements are unidirectional and, if a bidirectional system is desired, another relay device and associated cam-operated switch must be included in addition to those elements just described. In a unidirectional arrangement, if the motor-driving tuning device is oriented to a given station-selecting position and the antecedent position is required, the motor must drive the tuning device through nearly a complete cycle of movement to provide the selected condition. This result is inefficient as compared with a bidirectional system which greatly facilitates the tuning operation. However, as pointed out, to achieve bidirectionality in the previous arrangement additional elements are required and production costs are consequently undesirably high.

It is an object of this invention, therefore, to provide a novel direction-responsive arrangement for a reversible motor which avoids the deficiencies of the described prior system.

A further object of the invention is to provide a novel direction-responsive control arrangement for a reversible motor which is entirely efficient in operation and yet is inexpensive to construct.

In accordance with the invention, a direction-responsive control arrangement for a reversible motor comprises a cam supported for movement along a predetermined path. The cam extends along this path and terminates in spaced edge portions which define cam surfaces. The arrangement also includes a cam follower which has a pair of surfaces so positioned that one such surface engages one of the cam surfaces in response to movement of the cam in one direction while the other such surface engages the other of the cam surfaces in response to movement of the cam in the opposite direction. At least two of the aforementioned surfaces are inclined across the path of movement of the cam to deflect the follower relative to the path and in a sense determined by the direction of movement of the cam. Means are provided for mechanically coupling the cam to the motor at least during intervals in which the motor is energized. The system further includes one energizing circuit for the motor that is completed upon deflection of the follower in one sense to maintain movement of the cam and another energizing circuit for the motor that is completed upon deflection of the follower in the opposite sense to maintain movement of the cam, and means are provided for initially moving the cam along its path of movement.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Fig. 1 is a plan view of a turret assembly which includes a direction-responsive control arrangement constructed in accordance with the invention;

Fig. 2 is an end view of the assembly shown in Fig. 1;

Fig. 3 comprises a series of views taken along line 3—3 of Fig. 2 for various operating conditions; and Fig. 4 represents the electrical circuit connections for certain portions of the mechanism of Figs. 1 and 2.

Referring now more particularly to Fig. 1, there is represented a motor-driven tuning system for a wave-signal receiver, such as a television set, which system includes the control arrangement of the instant invention. The assembly there shown includes a tub-like mounting structure 10 provided with end plates 11 and 12. An elongated shaft 13 is rotatably supported by end plates 11 and 12 and extends through the interior of structure 10 and beyond each of its end plates. A cylindrically shaped turret member 14 includes a pair of disc-shaped end members 15 and 16 spaced from one another along shaft 13 and supported for rotation therewith. Turret 14 further includes a family of flat strips of insulating material, individually extending between and connected at each end to the discs 15 and 16. Only strips 17 through 21 appear in Fig. 1 although it will be understood that any number, up to the maximum accommodated by discs 15 and 16, may be provided. These strips are identical in construction and usually support one or more tuning elements for each of the radio-frequency amplifier, heterodyning oscillator, and mixer or first detector stages of a conventional tunable wave-signal receiver of the superheterodyne type. Also, pairs of contacts, such as those designated 23—24, 25—26 and 27—28 are mounted on each strip in circuit with the tuning elements thereof to provide a convenient means for operatively connecting any such strip into circuit engagement with the associated tunable stages of the receiver when the orientation of the turret brings the contacts of any given strip into contact with a corresponding series of stationary terminals 29—30, 31—32 and 33—34 supported on a strip 35 of insulating material secured to a side portion of structure 10. Of course, the tuning elements of each strip on the turret are preset so that the receiver is tuned to a preselected operating frequency, corresponding to a broadcast station or television channel as the case may be, whenever the tuning-element contacts of any strip engage the stationary contacts of structure 10. Turret tuners of this type and their electrical association with the tunable stages of a superheterodyne receiver are well understood in the art, rendering a more detailed description thereof unnecessary.

The end plate 16 of turret 14 is provided with a concentric, annular cam surface 43 of hill and dale configuration having one dale or depression corresponding to each peripheral portion of the end plate to which a tuning strip may be affixed. A leaf spring 44 is affixed at one extremity to end plate 12 of structure 10 and carries at its opposite end a cam-engaging ball or detent member 45 biased into engagement with cam surface 43. There is thus provided an indexing system whereby turret 14 may be accurately oriented at any one of a plurality of selected positions in which the contact-making elements of a selected one of the strips are in engagement with contacts 29—34.

A spur gear 46 is fixed to the extremity of shaft 13 projecting beyond end plate 15 and is in meshing engagement with another spur gear 47 supported for rotation with a shaft 48. The shaft 48 is journaled for rotation at one end in a bracket 49 affixed to member 11 of structure 10 and the other end is provided with a control knob 50. Another spur gear 51 is supported for rotation with shaft 48 in a position between gear 47 and knob 50 and is in driving engagement with a pinion 52 journaled for rotation on a stub shaft supported by a bracket 53, in turn, affixed to portion 11 of structure 10. Gear 52 is in driving engagement with the inwardly extending teeth (not shown) of an internal gear housed within and mechanically coupled to a cylindrical member 55 supported for rotation relative to shaft 48 and having an indicator scale inscribed on its outer periphery. The characters of this scale are preferably numbers designating the several tuning positions of the turret.

A fiber spur gear 56 is supported for rotation with shaft 13 near the right-hand extremity thereof (Fig. 1) and a driving motor 57 mounted on member 10 by a bracket 58 is positioned so that the axis of its shaft 59 is in the plane of gear 56, but does not intersect the gear proper. The shaft 59 carries a flexible shaft coupler 60 here shown as an elongated, cylindrical, resilient member. The other end of coupler 60 engages a worm shaft 61 carrying a worm gear 65 and journaled in spaced arms 62 and 63 of a carriage member 64. The carriage 64 is loosely mounted on a pair of studs 66 and 67 for movement in a direction perpendicular to shaft 59 of motor 57 and perpendicular to shaft 13. These studs project from a bracket 68 that is affixed to a plate 69 supported from portion 12 of unit 10. A leaf spring 70 is anchored at one end to stud 67 and its other end bears against the under side of carriage 64 to bias the carriage and worm 65 out of engagement with spur 56, the heads of studs 66 and 67 limiting upward movement of carriage 64.

An electro-magnet 71 is supported on an extension of bracket 68 with its pole piece facing carriage 64 and the carriage, being constructed of magnetic material, serves as the armature of the magnet. Therefore, when magnet 71 is energized, the magnetic field produced thereby is effective to attract carriage 64 toward the magnet and carry worm 65 from its inactive position to an operating position in driving engagement with spur gear 56. Consequently, spur gear 56, worm 65 and magnet 71 selectively permit a driving connection to be completed, coupling motor shaft 59 with turret shaft 13. Motor 57 preferably is of the split-field, reversible type so that turret shaft 13 may be power-operated in either of two rotational directions.

Referring now more particularly to the portions of the apparatus which, in accordance with the invention, provide a direction-responsive control arrangement for a reversible motor, a disc member 75 is secured to the end of shaft 13 that extends beyond gear 56. The disc 75 includes a plurality of flat, tooth-like cams equi-spaced about its periphery, one cam being provided for each tuning-strip accommodation of turret 14. For convenience, however, only the cams 76, 77, 78 and 79 have been shown. Since the cams rotate with disc 75, they are supported for movement along a predetermined curvilinear or circular path. As more clearly shown in Fig. 3, each of the cams terminates in tapered, spaced edge portions which define cam surfaces. For example, with reference to Fig. 3a, cam 76 has edge portions W and X while cam 77 includes similar edge portions W' and X'.

An S-shaped cam follower 80 is supported at one end of a switch-actuating arm 81 of a resilient material, the other end of which is affixed to a switch assembly 82. A mounting plate 82' adjustably supported on member 69 carries the assembly 82 so that it is adjustable relative to the path of movement of the cams of disc 75. Follower 80 is spring biased in a normal quiescent position in the path of movement of the tooth cams and includes a pair of end surfaces Y and Z inclined in the same sense across the path of movement of the cams. In the quiescent condition of the system, follower 80 is disposed in the gap between two successive cam teeth of disc 75.

The switch assembly 82 is of the single-pole, double-throw type and includes one pair of normally open contacts 83 positioned on one side of element 81 so that when follower 80 is displaced in a direction toward the contacts 83, an energizing circuit for driving motor 57 in one direction is closed through the contacts. A pair of normally open contacts 84 is positioned on the other side of element 81 and, when follower 80 is displaced in the opposite direction, the contacts 84 complete another energizing circuit for driving motor 57 in the opposite direction.

With reference to Fig. 4, the electrical circuit connections for the arrangement are as follows: The primary winding 85 of a step-down transformer 86 is connected to a plug adapted to be coupled to a source of alternating voltage, preferably at a potential of 110 volts and the secondary winding 87 is arranged to provide a potential of 24 volts. One terminal of winding 87 is connected through electromagnet 71 to the common connection between windings 88 and 89 of motor 57. A capacitor 90 is connected between the free ends of windings 88 and 89 and the junction of capacitor 90 and winding 88 is connected to the fixed contact of the normally open pair of contacts 83, the movable contact being returned to the remaining terminal of secondary 87 of transformer 86. The junction of capacitor 90 and winding 89 is connected to the fixed contact of normally open contact pair 84 and the movable contact thereof is connected with the movable contact of switch 83. Conductors 91, 92 and 93 connect switch 82 in parallel with another single-pole double-throw switch 94 which may be remote from the mechanism under consideration and is provided to permit remote control of the tuning.

Since electromagnet 71 is in series with the windings of motor 57, whenever the motor is energized the electromagnet is energized. This completes a driving connection to shaft 13 and all the rotatable components of the tuning mechanism during operating intervals in which the motor is energized.

In operation, the described motor-driven tuning system effects step-by-step rotational displacement of turret 14 in a selected direction to bring any particular one of the tuning strips into operative relation with the reeciver through the engagement of the terminals of tuning elements with the stationary terminals 29—34. The direction of rotation is usually chosen to bring the particular tuning strip into operative position as quickly as possible and the movement of the turret from one strip to the next is accomplished by the driving motor once its energizing circuit has been completed. The motor circuit may be established in either of two ways, by manual rotation of the control knob 50 or by actuation of the remote-control switch 94. For convenience, the control of the motor will be considered initially on the assumption that control knob 50 is manually operated to accomplish tuning.

Let it be assumed that knob 50 is rotated to effect initial rotation of the turret 14 and the disc 75 in the direction represented by arrow 95 in Figs. 2 and 3. Cam 76 is displaced from its position in Fig. 3a toward follower 80 and surface X of the cam engages surface Y of the follower. Since surface Y is inclined to the path of movement of cam 76, follower 80 is displaced transversely to this path as indicated by arrow 96, and contacts 84 are closed (Fig. 1). The closing of contacts 84 completes an electrical circuit from secondary 87 of transformer 86 through electromagnet 71 and winding 89 of motor 57 and winding 88 is connected in series with condenser 90 across winding 89. The resulting magnetic field of electromagnet 71 displaces carriage 64 downwardly to bring worm 65 into driving engagement with spur gear 56 simultaneously with the energization of motor 57. The circuit connections to the motor are such that rotation of the turret and the associated elements continues in the initial direction. Follower 80 is maintained in its deflected condition by engagement with the flat side of cam 76. The circuit is opened when the cam clears the follower which is then returned to its normal condition by the bias of arm 81. The cams and follower 80 are so positioned that the motor and relay circuits are deenergized just before the turret reaches its indexed position whereupon, the bias of spring 44 acting upon detent 45 drives the turret further to its "homed" or detent-indexed position. The turret thus comes to rest at one step removed from its initial position. It will be observed that even if the motor circuit is shut off slightly beyond the required position of the turret the bias of spring 44 in cooperation with detent 45 and the annular cam 43 effects a mechanical displacement in the opposite direction to bring the turret to indexed position.

Assume now that the knob 50 is rotated initially in the direction opposite to that of the above example to carry the turret and disc in the reverse direction. The cams are displaced from the position shown in Fig. 3a in the direction represented by arrow 97 in Fig. 3c and as a result follower 80 is displaced in the direction of arrow 98 which is opposite to the displacement of the prior example. This movement of follower 80 causes contacts 83 to be closed and the electromagnet 71 and the motor 57 are energized. The energizing circuit for the motor provides reverse rotation from that of the preceding example and the motor drives the turret in the manually initiated direction. As is the case for the example of Fig. 3b, the circuit is opened when the cam no longer maintains the follower in deflected condition. For this illustration the circuit shut-off feature may be better understood from an observation of Fig. 3d. Inasmuch as the extremity of follower 80 that is engaged with surface X' of cam 77 is freed thereof with but a small displacement of cam 77 from the position shown, the follower 80 quickly returns to a quiescent position.

Each of the afore-described conditions may be produced by the operation of remote switch 94. If the movable arm of this switch is displaced into engagement with either one of the fixed contacts, one of the two energizing circuits for the motor is completed. Contact need be maintained only until the motor drives the disc to a position wherein one of the cams deflects follower 80 and the circuit is sealed in the manner described in connection with the use of knob 50. Rotation continues until the next indexed position for the turret is obtained.

For step-by-step operation the remote switch is closed for but a moment. However, if the switch is held in a closed condition, the motor continuously drives the turret. When the switch is opened, if the follower 80 is between successive cams, the motor stops but if the follower is in a deflected condition, rotation continues until an indexed position is attained.

The invention thus provides a novel step-by-step direction-responsive control arrangement for a reversible motor which avoids the inefficiency of a unidirectional system. Moreover, the direction-responsive control arrangement, although entirely efficient in operation, is less expensive to construct than a system in which a group of electromechanical relays is required.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A direction-responsive control arrangement for a reversible motor comprising: a cam supported for movement along a predetermined path, extending along said path, and terminating in spaced edge portions defining cam surfaces; a cam follower having a pair of surfaces so positioned that one such surface engages one of said cam surfaces in response to movement of said cam in one direction while the other such surface engages the other of said cam surfaces in response to movement of said cam in the opposite direction, at least two of said surfaces being inclined across said path to deflect said follower relative to said path and in a sense determined by the direction of movement of said cam; means for mechanically coupling said cam to said motor at least during intervals in which said motor is energized; one energizing circuit for said motor completed upon deflection of said follower in one sense to maintain movement of said cam; another energizing circuit for said motor completed upon deflection of said follower in the opposite sense to maintain movement of said cam; and means for initially moving said cam along said path.

2. A direction-responsive control arrangement for a reversible motor comprising: a plurality of cams supported for movement along a predetermined path, successively and equally spaced from one another along said path, and each extending along said path and terminating in spaced edge portions defining cam surfaces; a cam follower having a pair of surfaces so positioned that one such surface engages one of said cam surfaces in response to movement of said cams in one direction while the other such surface engages the other of said cam surfaces in response to movement of said cams in the opposite direction, at least two of said surfaces being inclined across said path to deflect said follower relative to said path and in a sense determined by the direction of movement of said cams; means for mechanically coupling said cams to said motor at least during intervals in which said motor is energized; one energizing circuit for said motor completed upon deflection of said follower in one sense to maintain movement of said cams; another energizing circuit for said motor completed upon deflection of said follower in the opposite sense to maintain movement of said cams; and means for initially moving said cams along said path.

3. A direction-responsive control arrangement for a reversible motor comprising: a disc member including a plurality of tooth-like cams supported at the periphery thereof for movement therewith along a curvilinear path, successively and equally spaced from one another along said path, and each extending along said path and terminating in spaced edge portions defining cam surfaces; a cam follower having a pair of surfaces so positioned that one such surface engages one of said cam surfaces in response to movement of said cams in one direction while the other such surface engages the other of said cam surfaces in response to movement of said cams in the opposite direction, at least two of said surfaces being inclined across said path to deflect said follower relative to said path and in a sense determined by the direction of movement of said cams; means for mechanically coupling said disc member to said motor at least during intervals in which said motor is energized; one energizing circuit for said motor completed upon deflection of said follower in one sense to maintain movement of said cams; another energizing circuit for said motor completed upon deflection of said follower in the opposite sense to maintain movement of said cams; and means for initially moving said cams along said path.

4. A direction-responsive control arrangement for a reversible motor comprising: a cam supported for movement along a predetermined path, extending along said path, and terminating in spaced edge portions defining cam surfaces; a cam followed positioned in said path and having a pair of surfaces inclined in the same sense across said path, each of said surfaces being engageable by a respective one of said cam surfaces in response to movement of said cam to deflect said follower relative to said path and in a sense determined by the direction of movement of said cam; means for mechanically coupling said cam to said motor at least during intervals in which said motor is energized; one energizing circuit for said motor completed upon deflection of said follower in one sense to maintain movement of said cam; another energizing circuit for said motor completed upon deflection of said follower in the opposite sense to maintain movement of said cam; and means for initially moving said cam along said path.

5. A direction-responsive control arrangement for a reversible motor comprising: a cam supported for movement along a predetermined path, extending along said path, and terminating in spaced edge portions defining cam surfaces; an S-shaped cam followed positioned in said path and having a pair of end surfaces inclined in the same sense across said path, each of said surfaces being engageable by a a respective one of said cam surfaces in response to movement of said cam to deflect said follower relative to said path and in a sense determined by the direction of movement of said cam; means for mechanically coupling said cam to said motor at least during intervals in which said motor is energized; one energizing circuit for said motor completed upon deflection of said follower in one sense to maintain movement of said cam; another energizing circuit for said motor completed upon deflection of said follower in the opposite sense to maintain movement of said cam; and means for initially moving said cam along said path.

6. A direction-responsive control arrangement for a reversible motor comprising: a disc member including a plurality of flat, tooth-like cams supported at the periphery thereof for movement therewith along a curvilinear path, successively and equally spaced from one another along said path, and each extending along said path and terminating in tapered spaced edge portions defining cam surfaces; a cam follower spring biased in a normal position in said path and having a pair of surfaces inclined in the same sense across said path, each of said surfaces being engageable by a respective one of said cam surfaces in response to movement of said cams to deflect said follower relative to said path and in a sense determined by the direction of movement of said cams, said follower being maintainable in deflected condition by engagement with the flat portion of that cam which effects such deflection; means for mechanically coupling said disc member to said motor at least during intervals in which said motor is energized; one energizing circuit for said motor completed upon deflection of said follower in one sense to maintain movement of said cams; another energizing circuit for said motor completed upon deflection of said follower in the opposite sense to maintain movement of said cams; and means for initially moving said cams along said path.

7. A direction-responsive control arrangement for a reversible motor for driving a shaft to a predetermined angular position comprising: a cam coupled to said shaft and supported for movement along a predetermined path in response to movement of said shaft, said cam extending along said path and terminating in spaced edge portions defining cam surfaces; a cam follower having a pair of surfaces so positioned that one such surface engages one of said cam surfaces in response to movement of said cam in one direction while the other such surface engages the other of said cam surfaces in response to movement of said cam in the opposite direction, at least two of said surfaces being inclined across said path to deflect said follower relative to said path in a sense determined by the direction of movement of said cam; means for mechanically coupling said shaft to said motor at least during intervals in which said motor is energized; one energizing circuit for said motor completed upon deflection of said follower in one sense to maintain movement of said cam; another energizing circuit for said motor completed upon deflection of said follower in the opposite sense to maintain movement of said cam; and manual means for initially moving said cam along said path into engagement with said follower.

8. A direction-responsive control arrangement for a reversible motor comprising: a cam supported for movement along a predetermined path, extending along said path, and terminating in spaced edge portions defining cam surfaces; a cam follower having a pair of surfaces so positioned that one such surface engages one of said cam surfaces in response to movement of said cam in one direction while the other such surface engages the other of said cam surfaces in response to movement of said cam in the opposite direction, at least two of said surfaces being inclined across said path to deflect said follower relative to said path and in a sense determined by the direction of movement of said cam; means for mechanically coupling said cam to said motor at least during intervals in which said motor is energized; one energizing circuit for said motor completed upon deflection of said follower in one sense to maintain movement of said cam; another energizing circuit for said motor completed upon deflection of said follower in the opposite sense to maintain movement of said cam; and a remote-control switching circuit for initially energizing said motor to move said cam along said path into engagement with said follower.

9. A direction-responsive control arrangement for a reversible motor for driving a shaft to a predetermined angular position comprising: a cam coupled to said shaft and supported for movement along a predetermined path in response to movement of said shaft, said cam extending along said path and terminating in spaced edge portions defining cam surfaces; a cam follower having a pair of surfaces so positioned that one such surface engages one of said cam surfaces in response to movement of said cam in one direction while the other such surface engages the other of said cam surfaces in response to movement of said cam in the opposite direction, at least two of said surfaces being inclined across said path to deflect said follower relative to said path in a sense determined by the direction of movement of said cam; a worm and spur gear for mechanically coupling said shaft to said motor but normally maintained out of coupling engagement with one another; means for engaging said worm and said gear during operating intervals in which said motor is energized; one energizing circuit for said motor completed upon deflection of said follower in one sense to maintain movement of said cam; another energizing circuit for said motor completed upon deflection of said follower in the opposite sense to maintain movement of said cam; and means for initially moving said cam along said path.

10. A direction-responsive control arrangement for a reversible motor for driving a shaft to a predetermined angular position comprising: a plurality of cams supported for movement along a predetermined path, successively and equally spaced from one another along said path, and each extending along said path and terminating in spaced edge portions defining cam surfaces; a cam follower having a pair of surfaces so positioned that one such surface engages one of said cam surfaces in response to movement of said cams in one direction while the other such surface engages the other of said cam surfaces in response to movement of said cams in the opposite direction, at least two of said surfaces being inclined across said path to deflect said follower relative to said path in a sense determined by the direction of movement of said cams; a worm and spur gear for mechanically coupling said shaft to said motor but normally maintained out of coupling engagement with one another; means for engaging said worm and said gear during operating intervals in which said motor is energized; one energizing circuit for said motor completed upon deflection of said follower in one sense to maintain movement of said cams; another energizing circuit for said motor completed upon deflection of said follower in the opposite sense to maintain movement of said cams; a detent mechanism associated with said shaft for homing said shaft to an indexed position when said cam follower is positioned between successive ones of said cams; and means for initially moving said cams along said path.

KENNETH M. CHAPPELL.

No references cited.